United States Patent
Nieminen

(10) Patent No.: US 6,696,772 B2
(45) Date of Patent: Feb. 24, 2004

(54) SYNCHRONOUS RECTIFICATION

(75) Inventor: Pentti Nieminen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/166,716

(22) Filed: Jun. 12, 2002

(65) Prior Publication Data

US 2003/0001436 A1 Jan. 2, 2003

Related U.S. Application Data

(63) Continuation of application No. PCT/FI00/01094, filed on Dec. 14, 2000.

(30) Foreign Application Priority Data

Dec. 14, 1999 (FI) .............................................. 19992686

(51) Int. Cl.[7] ................................................. H02J 9/00
(52) U.S. Cl. ..................................... 307/151; 307/149
(58) Field of Search ............................. 307/80, 82, 151, 307/149; 363/26, 25, 24

(56) References Cited

U.S. PATENT DOCUMENTS

| | | | |
|---|---|---|---|
| 5,726,869 A | 3/1998 | Yamashita et al. ............ 363/21 |
| 5,872,705 A | 2/1999 | Loftus, Jr. et al. ............ 363/21 |
| 5,907,481 A | 5/1999 | Svärdsjö ..................... 363/25 |
| 5,999,420 A | 12/1999 | Aonuma et al. ............... 363/21 |
| 2001/0033506 A1 | * 10/2001 | Farrington et al. ......... 363/127 |
| 2002/0071293 A1 | * 6/2002 | Eden et al. .................... 363/20 |

* cited by examiner

*Primary Examiner*—Brian Sircus
*Assistant Examiner*—Robert L. DeBeradinis
(74) *Attorney, Agent, or Firm*—Antonelli, Terry, Stout & Kraus, LLP

(57) ABSTRACT

A direct-current converter converts an input voltage into an output voltage. It has and which comprises an operating voltage source, a power transformer having a primary side and secondary side, an input voltage source connected to the power transformer, at least one first power switch disposed on the primary side, and at least one second power switch disposed on the secondary side and rectifying the output voltage. The direct-current converter also has a regulating circuit, which is connected to the first power switch and the second power switch to control the timing of their switching functions, and an auxiliary power source arranged to supply power to the regulating circuit and connected to the operating voltage.

11 Claims, 5 Drawing Sheets

SYNCHRONOUS RECTIFICATION

This application is a continuation of PCT Application No. PCT/FI00/01094 filed Dec. 14, 2000.

FIELD OF THE INVENTION

The present invention relates to power source technology. In particular, the invention relates to a DC/DC converter which uses controlled synchronous rectification.

BACKGROUND OF THE RELATED ART

Almost all electronic circuits require a direct-current power source (DC/DC converter). A direct-current converter as described e.g. in the publication "Soft switched PWM DC/DC converter with synchronous rectifiers", Li Xiau, Rames Oruganti, converts an input voltage into an output voltage by switching or modulating the input voltage into a wave-mode pulse using high-power MOSFET switches. The pulse is further connected across a power transformer to the secondary side of the transformer and rectified to produce an output voltage. The output voltage is regulated e.g. by the width of an asymmetrically modulated pulse.

In DC converters, as in other electronic components as well, increasing the power density and improving the efficiency are subjects under continuous development. increasing the power density by increasing the component density is difficult because this leads to heating of components unless the power dissipation remaining in the structure is reduced at the same time, in other words, unless the efficiency is improved. The current trend toward lower operating voltages (5 V, 3.3 V, 2.5 V, 2.8 V . . . ) with the power demand remaining the same or even increasing has led to increasing heat problems in DC converters.

For the rectification of low voltages, the transformer secondary is often provided with a Schotky diode, in which, even in an optimal case, there remains a voltage drop of about 350 mV, which e.g. in a 2.5-V output voltage means a 14-% power loss.

At present, no techniques are known that could be used to improve the situation by reducing the power dissipation remaining in the Schottky diode, so the best way to improve the efficiency is to replace the diode rectifier with a MOSFET synchronous rectifier. Low-voltage MOSFETs have undergone rapid development as their channel resistance and gate charge have been reduced, the variety of enclosure alternatives has been increased and the number of manufacturers has grown, which has led to competition and lower prices. This has accelerated the transition to MOSFET technology, although that again produces a whole lot of new problems.

In synchronous rectification, the rectifier diodes (Schottky diodes) after the isolating transformer used in the DC converter are replaced by MOSFETs having a low channel resistance ($R_{DS(on)}$). In this arrangement, two different operating principles are in use, which are described in the above-mentioned publication "Soft switched PWM DC/DC converter with synchronous rectifiers".

The first operating principle is self regulation, whereby the regulating circuit of the DC converter only controls one or more power switches on the primary side of a power transformer while the rectifier switches on the secondary side are controlled by the voltages of the secondary coils of the power transformer. In another arrangement, a regulating circuit controlling both primary and secondary side switches is used. The regulating circuit may be placed either on the input voltage side (primary side) or on the output voltage side (secondary side), involving different circuit solutions and properties in practical implementations.

The self-regulated synchronous rectifier for the forward topology has been thoroughly investigated and is a much favored solution, as is also suggested by the numerous articles written about this subject. The push-pull topology is ill adapted for a self-regulated synchronous rectifier because its power transformer does not provide a suitable control voltage to the rectifier switches during the off phase but the output current flows via the body diodes of the MOSFET switches, thus "spoiling" the efficiency. The solutions used at present are based on two-stage topology with a buck regulator placed first to take care of voltage regulation and current limitation and a 50%/50% push-pull stage placed after it to produce isolation. The problem of this solution is encountered in a current limitation situation where the output voltage falls to zero and the MOSFETs lose their control voltage. Therefore, Schottky diodes need to be connected in parallel with the MOSFETs, thus reintroducing the problems described above.

The self-regulated forward topology also involves problems. First of all, this topology is only suited for use with certain output voltages when secondary coil control is used. Typically, these voltages are 5 V and 3.3 V. With other output voltages, separate control windings are required in the transformer. The large range of variation of the input voltage involves an obvious risk of the rectifier and flywheel FETs receiving an insufficient or excessive control voltage at the extremities of the input voltage range. Likewise, the large range of variation of the load current involves problems regarding control. In an open-circuit condition, the topology involves a tendency to self-induced oscillation of the rectifier, which confuses the control of the regulating circuit and the primary switch. In the cases of current limitation and short circuit, the flywheel FET loses its control voltage and the current starts flowing via a body diode unless a Schottky diode has been connected in parallel with the FET.

Furthermore, the control of the flywheel FET is defective at reset of the power transformer unless an active reset circuit or a corresponding auxiliary circuit is used. At changes of state, the output current is instantaneously forced to flow via the body diodes, involving additional losses and reducing the efficiency. The use of converters in parallel without isolating diodes causes problems at start-up and shutdown of the converters and in situations where the power tends to circulate internally between the converters.

Synchronous rectification controlled by a regulating circuit is discussed e.g. in the above-mentioned article "Soft switched PWM DC/DC converter with synchronous rectifiers", and it involves certain timing errors which give rise to defects of a certain order. FIG. 1 presents a diagram illustrating the principle of push-pull topology and showing the measuring points for the measurement of the associated curve forms. FIG. 1 shows an input voltage source $U_i$ and an output voltage $U_o$. A power transformer T is placed between the input voltage and the output voltage. Connected to the power transformer are primary side MOSFET switches swA and swB and secondary side MOSFET switches srA and srB, which in this circuit function as synchronous rectifiers. Connected to the secondary side is also an output filter for filtering the output voltage to remove any extra noise signals from it. Moreover, FIG. 1 shows the measuring points at which the curve forms presented in FIGS. 2 and 3 are measured, the voltage across the primary switches being indicated by arrows $U_{swA}$ and $U_{swB}$ and the voltage across the secondary switches by arrows $U_{srA}$ and $U_{srB}$. The current through the primary winding and switches is indicated by arrows $I_{swA}$ and $I_{swB}$, and the current through the secondary winding and switches by arrows $I_{srA}$ and $I_{srB}$~FIG. 1 also shows the control signals A, B, $\underline{A}$ and $\underline{B}$ controlling the switches.

FIG. 2 presents the ideal curve forms in the operation of the topology illustrated in FIG. 1. FIG. 3 presents a more detailed illustration of instants t2 and t3 included in FIG. 2, which correspond to the instants of change of the control voltage $\underline{B}$ applied to secondary side power switch srB. Using the control signal B of primary side power switch swB as a reference, the figure illustrates the consequences that will follow if the control signal $\underline{B}$ driving power switch srB lags behind or leads the control signal B driving power switch swB.

FIG. 2 presents the ideal curve forms representing the operation of the circuit in FIG. 1, showing eight instants of time which are focused on in the analysis. In particular, the changes occurring at instants t2 and t3 on the rising and falling edges of control signal B will be considered. These instants are more closely analyzed in FIG. 3, which presents two situations on the rising edge of control signal B and two situations on its falling edge.

On the rising edge of control signal B, when control signal $\underline{B}$ falls too early, the coil current flowing through the power transformer is routed via the body diode of power switch srB, causing dissipation. When control signal B goes up, a recovery current in the reverse direction of the body diode flows for some time, causing further dissipation. When control signal B goes down too late, the rise of control signal B turns power switch swB into conduction while power switch srB is still conducting. This results in an internal short circuit, the short-circuit current being limited in the first place by the stray inductance of the power transformer. This leads to a high power dissipation level and may damage the components.

On the falling edge of control signal B, when control signal $\underline{B}$ rises too early, power switch swB is still conducting as power switch srB is turned on, although there is a full reverse voltage across it. In this case, too, an internal short circuit is produced where the short-circuit current is mainly limited by the stray inductance of the power transformer. This again results in a high power dissipation and possible damage to components. When control signal $\underline{B}$ rises too late and when power switch swB is turned off, the output coil current is routed through the body diode of power switch srB, producing further dissipation until control signal $\underline{B}$ goes up and the current flow is shifted to the channel of power switch srB.

If we present the timing errors illustrated in FIG. 3 in order according to the degree of seriousness of the consequences, then the order is as follows: 3, 2, 1, 4. From this it can be concluded that the power switches have to be so controlled that errors 3 and 2 are completely prevented and eliminated and errors 1 and 4 minimized to the lowest level possible.

An the object of the preferred embodiments is to eliminate or to significantly reduce the above-described problems relating to known DC converters.

A specific object of the preferred embodiments is to disclose a controlled synchronous DC converter working on the push-pull principle in which an internal short circuit due to timing delays of the primary and secondary switches is prevented. A further object is to minimize the additional rectification losses caused by timing delays.

A further object of the preferred embodiments is to increase the power density of the DC converter and to improve its efficiency.

BRIEF SUMMARY

The preferred embodiments of the present invention concern a direct-current converter which converts an input voltage into an output voltage. The input voltage is obtained from an input voltage source, e.g. an accumulator, battery or an equivalent d.c. voltage source. The DC converter comprises a voltage source supplying the operating voltage to the regulating circuits and FETs. This voltage source may be an auxiliary chopper. In addition, the DC converter comprises a power transformer having a primary side and a secondary side. Placed on the primary side of the power transformer is at least one, preferably two power switches, for converting a d.c. voltage into a wave-mode voltage, and on the secondary side at least one, preferably two power switches for synchronous rectification of the output voltage. In a forward-type circuit, there may be one power switch on the primary side and two rectifier switches on the secondary side.

According to the preferred embodiments of the invention, the DC converter comprises a regulating circuit connected to a first power switch and to a second power switch to control their switching action, and an auxiliary power source arranged to supply power to the regulating circuit. By means of the regulating circuit, the power switches on the primary and secondary sides are so controlled that no unnecessary delays occur in the control, the switching order is always correct, the manufacturing tolerances of the components are taken into account and that the control is adapted to the prevailing conditions, such as the load of the converter.

The regulating circuit is disposed on the secondary side of the power transformer and the auxiliary power source is disposed on the primary side of the power transformer to supply isolated power to the regulating circuit via the auxiliary power source. The auxiliary power source generates the control power for the secondary side in all operational situations, such as start-up, normal operation and situations where the current is limited.

The regulating circuit may be a current-mode controlled push-pull circuit in which the active control state of the outputs is the high state. The regulating circuit is connected to the first power switch and to the second power switch to supply control power and a control signal to them. Further, the regulating circuit may also be a voltage-mode circuit with current balance. The control state of the regulating circuit may also be the low state, in which case corresponding changes need to be made in the FET controllers.

In addition, the DC converter may comprise a number of power switch controllers which are controlled by the regulating circuit and which further control the power switches. One controller is connected to each power switch.

Furthermore, the DC converter comprises a low-pass output filter consisting of a coil and a capacitor. The filter is adapted separately as needed in each case and is a technical solution known to the skilled person.

If the operation of the converter is to be controlled using external on/off control or when the input voltage is switched off, then the rectifier switches on the secondary side have to be turned off to ensure that the output capacitor of the filter is not discharged in short circuit via the rectifier switches. For this purpose, the DC converter is provided with an undervoltage guard circuit, e.g. a comparator, by means of which the secondary side rectifier switches are turned off and the regulating circuit is deactivated. The secondary side rectifier switches can also be used in special cases, e.g. in the case of parallel-connected DC converters to avoid problematic operational situations, by connecting to them an external control input which can be used to turn off the rectifier switches without interrupting the operation of the converter.

The rectifier switches can also be used for overvoltage protection of the output. In this case, the DC converter comprises an overvoltage protector, which is preferably implemented using a comparator. When the overvoltage protector detects an overvoltage, it interrupts the operation of the regulating circuit, both of the secondary side rectifier switches being thus left in the conducting state, forming a so-called "crowbar" overvoltage protection circuit.

As compared with prior art, the preferred embodiments of the present invention has the advantage that no Schottky diodes need to be connected in parallel with the rectifier switches, thus allowing a significant reduction of dissipation in the rectification of low output voltages. Moreover, it is possible to reduce the cooling required by electronic equipment, increase the power density and improve the efficiency while at the same time prolonging the useful life of components as a result of cooler operation.

A further advantage of the preferred embodiments is that the rectifier switches are turned off at start-up and shut-down of the converter and when on/off control is used. An additional advantage is that the rectifier switches can be turned off in all operational situations, such as start-up and current limiting situations and normal operation, without completely interrupting the operation of the converter. Moreover, the preferred embodiments of invention allow the rectifier switches to be turned on by an output overvoltage protector.

BRIEF DESCRIPTION OF THE DRAWINGS

In the following, the invention will be described in detail by the aid of a few examples of its embodiments with reference to the attached drawings, wherein.

DETAILED DESCRIPTION OF THE PREFERRED EMBODIMENTS

Figure 1:
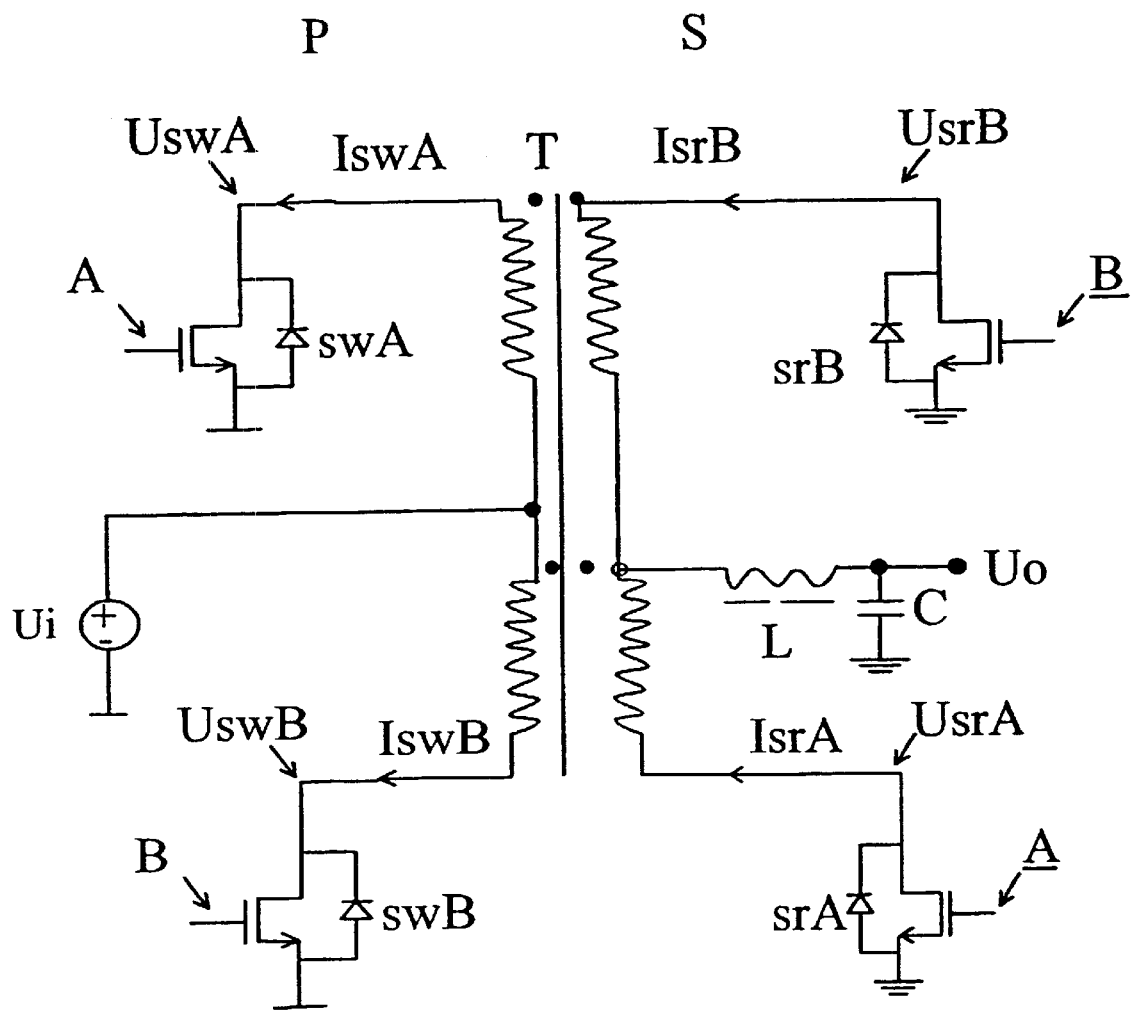
FIG. 1 presents a diagram of the principle of push-pull topology.
Figure 2:
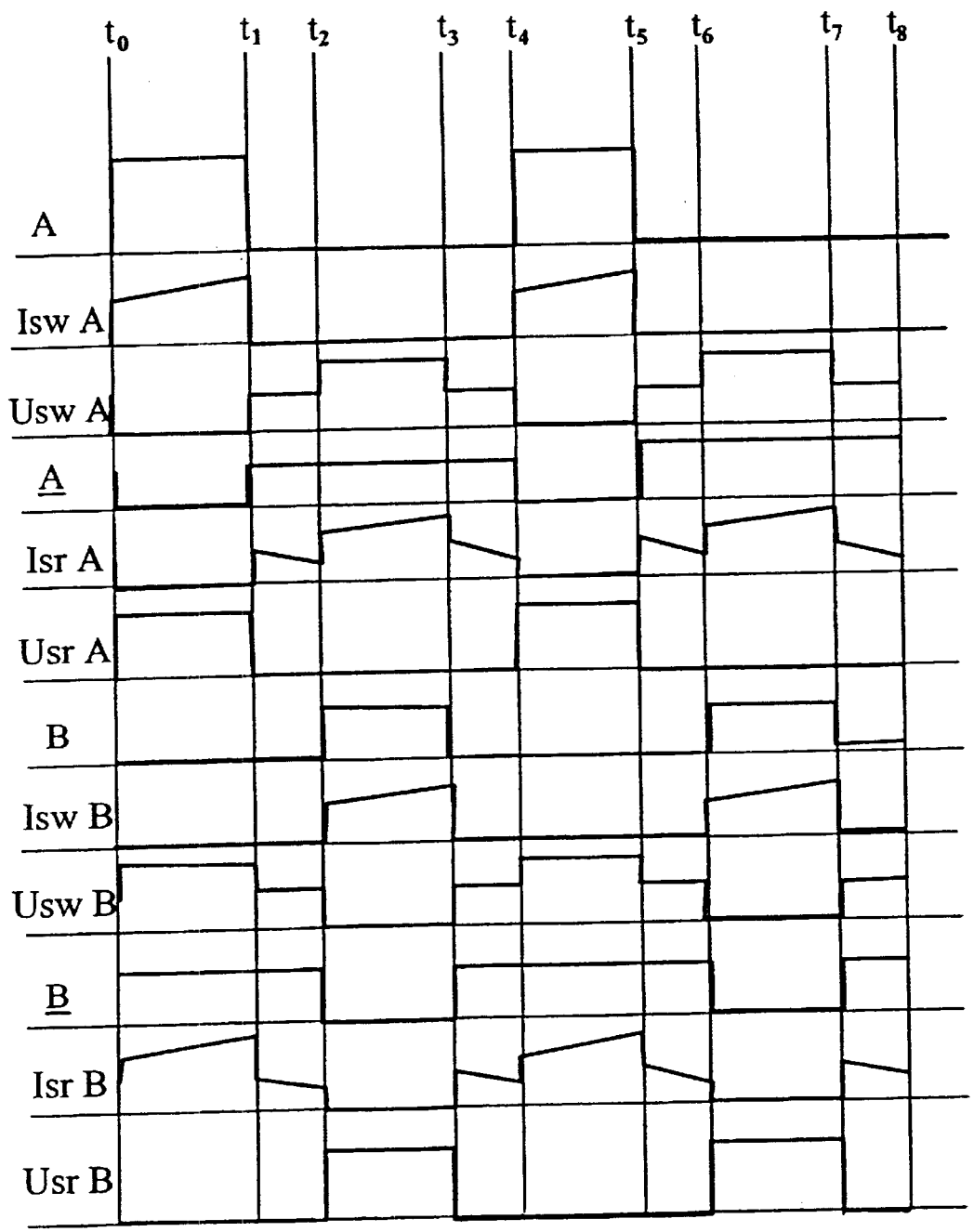
FIG. 2 presents ideal curve forms in the operation of a circuit as presented in FIG. 1.
Figure 3:
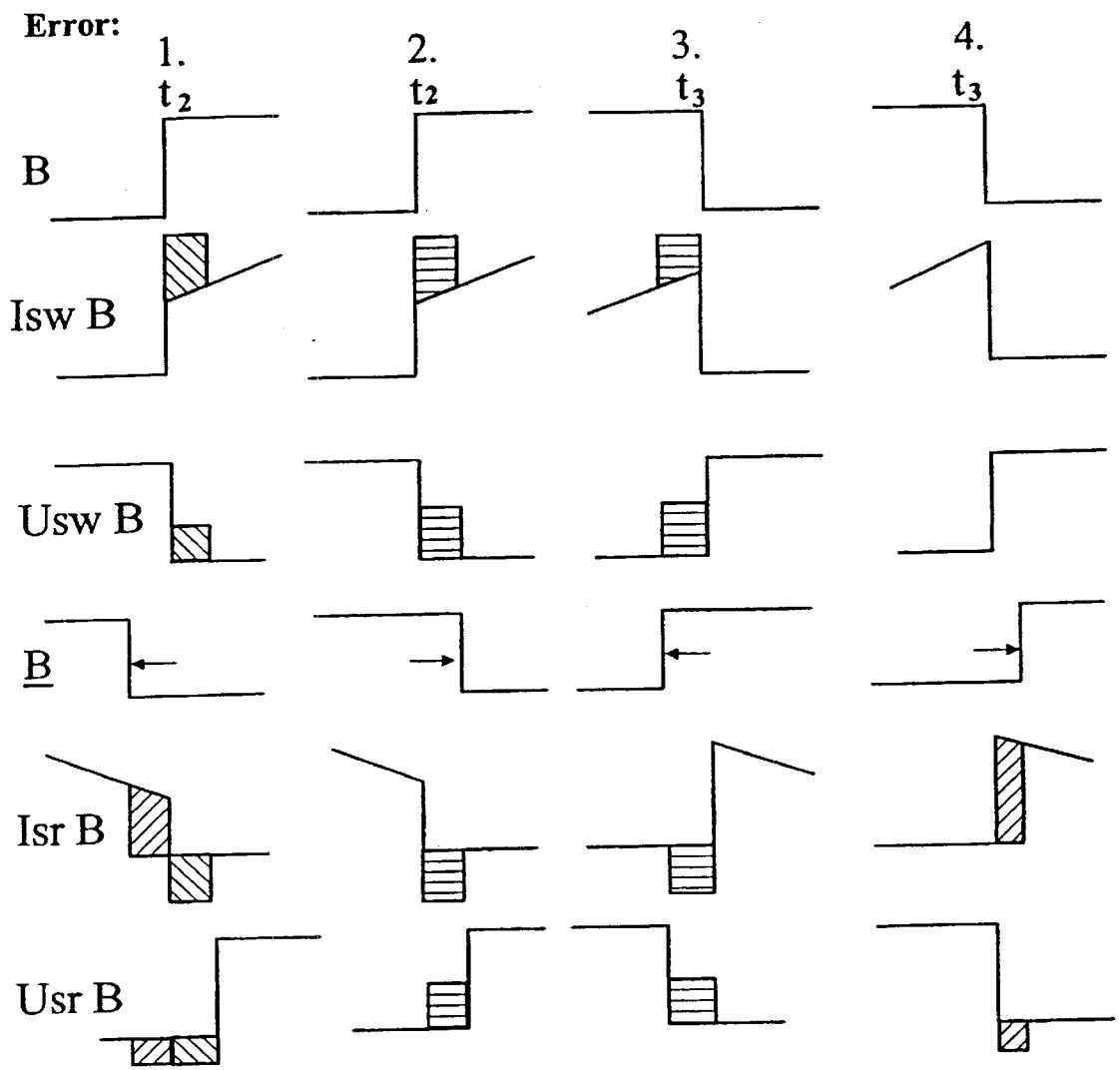
FIG. 3 represents instants t2 and t3 in FIG. 2, corresponding to instants of change of a control signal.
Figure 4:
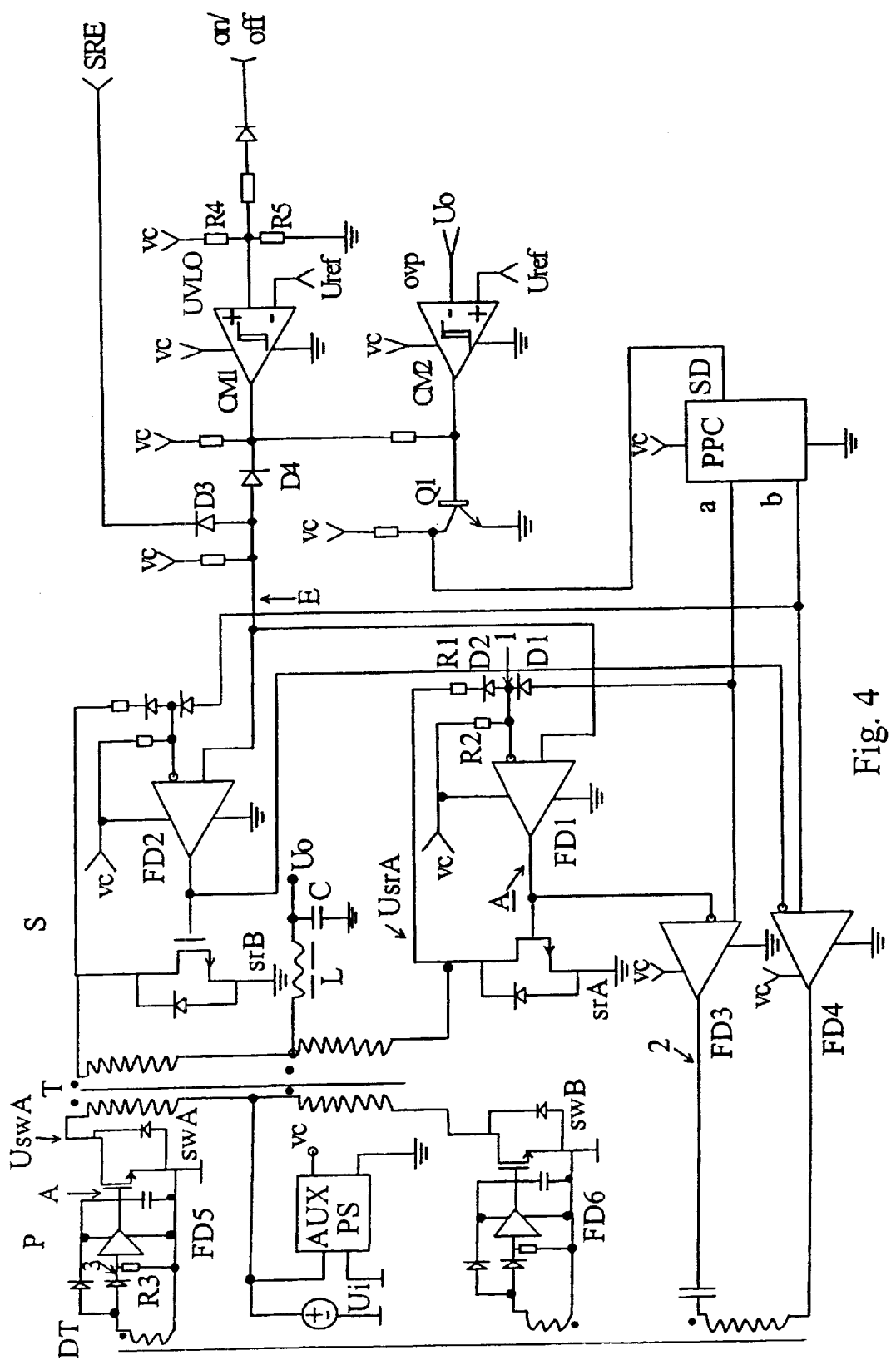
FIG. 4 presents a diagram of the principle of a push-pull DC converter according to a preferred embodiment.

FIG. 4 presents a circuit diagram of a DC converter according to a preferred embodiment of the invention. The main features of the components essential in respect of the operation of the DC converter will now be described without minutely describing the details of the diode, resistor and capacitor connections as it is assumed that these are technical features known in themselves to the skilled person and that the skilled person will be able to interpret the circuit in FIG. 4 without a detailed circuit description.

The DC converter comprises a power transformer T, which is used to implement the isolation of the input voltage $U_i$ from the output voltage $U_0$. The power transformer T has a primary side P and a secondary side S. Connected to the primary side P of the power transformer T are MOSFET power switches swA and swB, while MOSFET synchronous rectifiers srA and srB are connected to the secondary side. The primary side power switches swA and swB are controlled by FET switch controllers FD5 and FD6, respectively. The secondary side synchronous rectifiers srA and srB are similarly controlled by FET switch controllers FD1 and FD2, respectively. Connected to the secondary side S of the power transformer T is a regulating circuit PPC, which receives an isolated operating voltage $V_C$ from a low-power auxiliary chopper AUX PS connected to the primary side P. In addition, the low-power auxiliary chopper AUX PS is used to produce the control power needed by the primary side power switches swA and swB and the rectifier switches srA and srB. The regulating circuit PPC may be a conventional current-mode controlled push-pull circuit, the active control state of whose outputs is the high state. The outputs a and b of the regulating circuit PPC control the FET switch controllers FD1–FD6. The dual-input controllers FD1–FD4 of the switching FETs have a non-inverting input and an inverting input with an AND function between them. When control signal E is dropped to the low state, the rectifier switches can be turned off.

The circuit presented in FIG. 4 also comprises an under-voltage guard circuit UVLO, which in this example is a comparator CM1 and which pulls the control signal E down via diode D4 if the operating voltage $V_c$ is insufficient or if the other input, an on/off control input, is connected to earth. The synchronous rectifier switches srA and srB on the secondary side S are turned off and the regulating circuit is deactivated when transistor Q1 stops conducting and the input SD of the regulating circuit PPC goes up. Connected to the control signal E line via diode D3 is an external control input SRE, by means of which the synchronous rectifiers srA and srB can be turned off without stopping the operation of the converter altogether. This control input SRE can be used in the case of parallel-connected converters to avoid operational situations involving problems.

In addition, the synchronous rectifiers srA and srB on the secondary side S can be used for overvoltage protection of the output side $U_0$. For this purpose, the converter comprises an overvoltage protector OVP, which is implemented using a comparator CM2. When the circuit detects an overvoltage, its output goes down, transistor $Q_1$ stops conducting, signal SD goes up, the regulating circuit PPC is deactivated and its outputs a, b remain in the low state. In this situation, both of the synchronous rectifier switches srA and srB remain conducting, forming an overvoltage protection.

Figure 5:
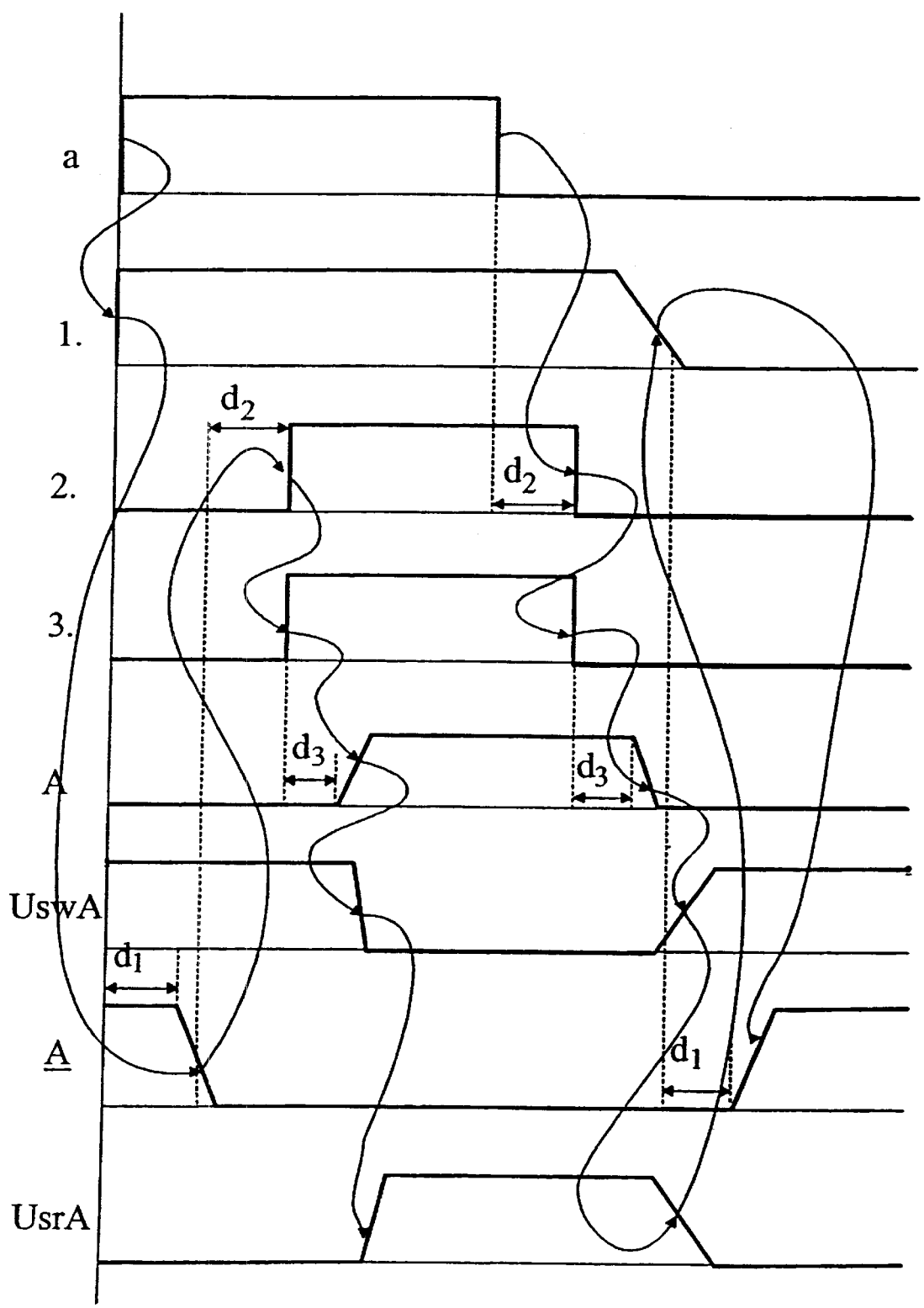
FIG. 5 presents a timing diagram illustrating the timing of the curve forms in the operation of a circuit as presented in FIG. 4.

Next, the operation of the circuit presented in FIG. 4 will be described with reference to FIGS. 4 and 5. FIG. 5 presents a diagram illustrating the timing of the curve forms in the operation of the circuit in FIG. 4. It can be seen from the timing diagram that control situations resulting from an internal short circuit as described above are prevented and the delays occurring between control signal states and causing additional dissipation are minimized.

When output a of the control circuit PPC goes up, the current flows via diodes D1 and D2 and resistor $R_1$ through the conducting rectifier switch srA to earth. At the same time, the inverting input of switching FET controller FD1, measuring point 1 (mp1), goes up. Upon the lapse of the internal propagation delay d1 of the controller FD1, the output A of the circuit goes down. The fall time of the voltage depends on the current sinking capacity of the controller output and on the input capacitance of the rectifier switch srA being controlled. The non-inverting input of power FET controller FD3 is already in the 1-state, corresponding to output a of the regulating circuit, when control signal A falls below the threshold voltage $V_{Gs(th)}$ of synchronous rectifier switch srA. Thus, the output mp2 of controller FD3 goes up after the propagation delay d2 of the circuit.

The primary side power switches swA and swE are controlled by an isolated control signal over a driver transformer DT. Controllers FD5 and FD6 do not burden the driver transformer during the rising edge of the pulse, so the voltage at measuring point mp3 is not delayed but turns power switch swA immediately into conduction. The polarity of the voltages in the coils of the power transformer T is reversed so that the dotted ends have a negative voltage. After a while, a reverse voltage is set up across the open synchronous rectifier switch srA after the entire load current flow has been shifted to the route through synchronous rectifier switch srB.

When the output of the control circuit goes down, the output mp2 of controller FD3 goes down after a delay d2. The input of controller FD5 goes down rapidly according to the time constant determined by its input capacitance and resistor R3, and its output A goes down after a delay d3. Meanwhile, the inverting input of controller FD1 is held in the 1-state via resistor R2 as diodes D1 and D2 are both reverse-biased. When power switch swA is opened, the reverse voltage across it rises at a rate determined by the prevailing breaking current and the circuit capacitances. The voltage change appears across all coils of the power transformer, and the voltage across synchronous rectifier switch srA falls toward zero, driven by the output coil current. When the voltage $U_{srA}$ is about 2V, the inverting input mp1 of controller FD1 identifies it via resistor R1 and diode D2 as logic state 0 and output A goes up after a delay d1.

The circuit functions in a corresponding manner during the second half-cycle when output B of the regulating circuit emits a pulse.

From the timing diagram in FIG. 5, it can be seen that the circuit does not permit the occurrence of a control situation that would result in an internal short circuit, and that all delays leading to body diode conduction are minimized and adaptable to changing operational conditions and the variation of component tolerances. No Schottky diodes need to be connected in parallel with the rectifier switches srA and srB as these are properly controlled in all operational situations.

In the foregoing, the action of the circuit 15 has been described with reference to a traditional push-pull implementation. The principle described can also be used with traditional half-bridge and full-bridge topologies, but it will exhibit its best advantages when employed in an integrated magnetic push-pull converter implemented using a single ferrite core.

The principle can also be modified to suit the forward topology by using controller FD1 to control a flywheel FET and using a controller that gives a control signal in opposite phase relative to it to control the synchronous rectifier switches.

The invention is not restricted to the examples of its embodiments described above; instead, many variations are possible within the scope of the inventive idea defined in the claims.

What is claimed is:

1. A direct-current converter which converts an input voltage into an output voltage, comprising:
    a power transformer having a primary side and a secondary side,
    an input voltage source connected to said power transformer, at least one first power switch disposed on said primary side, and at least one second power switch disposed on said secondary side and serving to rectify the output voltage,
    a regulating circuit, which is connected to said first power switch and to said second power switch to control the timing of their switching action, and
    an auxiliary power source, which has been arranged to supply power to said regulating circuit and produce an output voltage.

2. A direct-current converter as recitedin claim 1, said regulating circuit is disposed on the secondary side of said power transformer and said auxiliary power source is disposed on the primary side of said power transformer to supply isolated power to the regulating circuit via the auxiliary power source.

3. A direct-current converter as recited in claim 1, wherein said regulating circuit is a current-mode controlled push-pull circuit, the active control state of its outputs being the high state.

4. A direct-current converter as recited in claim 1, the number of power switches connected to the secondary side corresponds to the number of power switches connected to the primary side.

5. A direct-current converter as recited in claim 1, further comprising two power switches on said primary side.

6. A direct-current converter as recited in claim 1, wherein the direct-current converter further comprises a number of power switch controllers.

7. A direct-current converter as recited in claim 6, wherein each power switch has a power switch controller connected to it.

8. A direct-current converter as recited in claim 1, wherein the direct-current converter further comprises a low-pass filter consisting of a coil and a capacitor.

9. A direct-current converter as recited in claim 1, wherein the direct-current converter further comprises an undervoltage guard circuit connected to said power switch on the secondary side and comprising a first input, to which is connected an external signal for activating and deactivating the direct-current converter, said undervoltage guard circuit working with the same output voltage as the auxiliary power source.

10. A direct-current converter as recited in claim 1, wherein the direct-current converter further comprises an overvoltage protector which is connected to the output voltage for comparing it with a predetermined reference voltage and interrupting the operation of the direct-current converter when said output voltage exceeds the predetermined reference voltage.

11. A direct-current converter as recited in claim 1, wherein the direct-current converter further comprises an external control input which is connected to said secondary side power switch to allow it to be turned off.

* * * * *